UNITED STATES PATENT OFFICE.

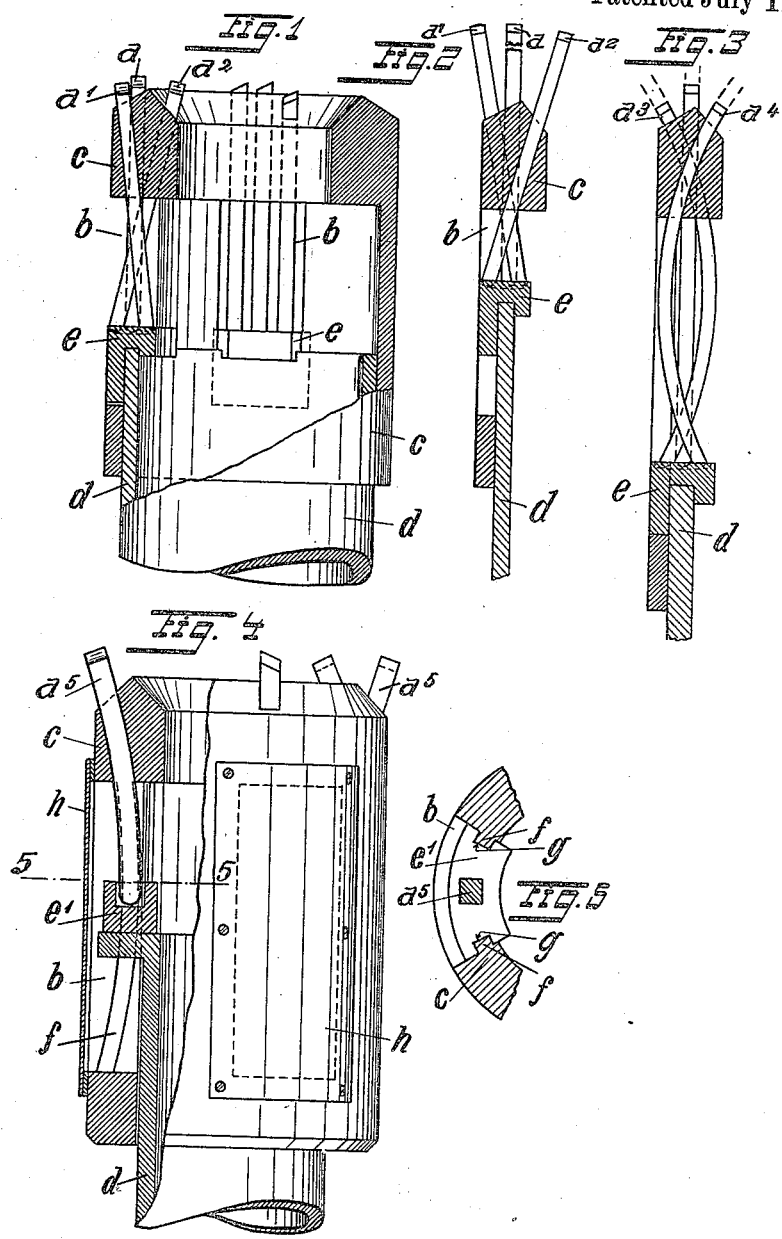

HANS HUNDRIESER, OF HALENSEE, NEAR BERLIN, GERMANY.

TUBULAR ROCK DRILL.

1,422,361.  Specification of Letters Patent.  Patented July 11, 1922.

Application filed January 19, 1921. Serial No. 438,507.

*To all whom it may concern:*

Be it known that I, HANS HUNDRIESER, a citizen of the German Empire, residing at Halensee, near Berlin, Germany, have invented certain new and useful Improvements in Tubular Rock Drills, of which the following is a specification.

The subject of the invention is a rock core drill of tubular form with cutters arranged for subsequent adjustment in window like openings in the crown of the drill.

In accordance with the invention the cutters are guided at their working ends in the crown of the drill and are supported at their other ends on supports which in consequence of their longitudinal displacement permit a suitable subsequent adjustment of the cutters corresponding to the wear.

The invention is illustrated in the accompanying drawing in which Fig. 1 is a longitudinal section through the new rock core drill. Fig. 2 shows the cutters in projecting position. Fig. 3 is a longitudinal section through another embodiment. Fig. 4 shows the further embodiment of a drill partly in longitudinal section and partly in elevation. Fig. 5 is a part transverse section on the line 5—5 of Fig. 4.

In the embodiment illustrated in Figs. 1 and 2 employing straight cutters some of the cutters $a$ are disposed parallel to the axis in the crown of the drill and some $a'$ and $a^2$ inclined inwardly and outwardly with respect thereto. The cutters thus grouped meet in a recess $b$ in the wall $c$ of the drill and rest with their ends on a support $e$ which is subsequently adjustable by the drill shaft $d$. When the drill shaft is pushed forward the cutters project in the manner shown in Fig. 2.

In using curved cutters $a^3$, $a^4$, (Fig. 3) the same effect is obtained but to a greater extent. The cutters are arranged with their convex sides alternately projecting inwardly and outwardly and cross one another first adjacent their cutting ends and then secondly adjacent the support $e$.

As shown in Figs. 4 and 5 the support $e'$ of the cutters $a^5$ is guided in the direction of feed by providing the lateral walls of the recesses $b$ with a guide rib $f$ which engages in a corresponding groove $g$ in the support $e'$. By such an arrangement the support is movable corresponding to the path of the end of the cutter, undesired movements of the cutters being thereby avoided. The feed and the adjustment of the cutters are effected by the drill shaft $d$ which is movable in the crown $c$ of the drill. When the crown $c$ is placed on the drill shaft $d$, the supports $e$ will be put through the openings of the crown into the corresponding recesses of the drill shaft and will be fixed in any suitable manner in the drill shaft.

The cutters will be inclined in the direction of rotation by the rotation of the drill shaft according to the play existing between the support and the sides of the openings in the crown.

The inclined cutters will be held by the bore dust penetrating between cutters and the sides of the perforations for the cutters in the crown, so that the cutters can only be removed by force.

If the drill is supplied with water for cooling or clearing purposes the recesses $b$ are covered by removable covers $h$ Fig. 4 so that the water must flow away beyond the front of the drill.

What I claim is:

1. In a tubular rock core drill, the combination of a drill shaft, a crown sliding thereon, recesses in said crown, supports adapted to be arranged in said recesses and to be carried by said drill shaft, and cutters arranged in the crown and adapted to rest on said supports.

2. In a tubular rock core drill, the combination of a drill shaft, a crown sliding thereon, perforations in the working end of said crown, recesses in said crown, supports arranged in said recesses and to be carried by said drill shaft and cutters resting with the lower end in said supports and sliding with the upper end in the said porforations of the crown.

3. In a tubular rock core drill, the combination of a drill shaft, a crown sliding thereon perforations in the working end of the crown arranged alternately parallel or inclined to the axis of the drill shaft, recesses in said crown, supports arranged in the said recesses and to be carried by said drill shaft, and cutters resting in said supports and sliding in the said perforations of the crown.

In testimony whereof I affix my signature in presence of two witnesses.

HANS HUNDRIESER.

Witnesses:
 ALFRED KATH,
 GEORG MICHEL.